March 29, 1938. A. G. EKLUND Re. 20,677
BRACELET BUCKLE CONSTRUCTION
Original Filed June 22, 1933
Fig. 1.
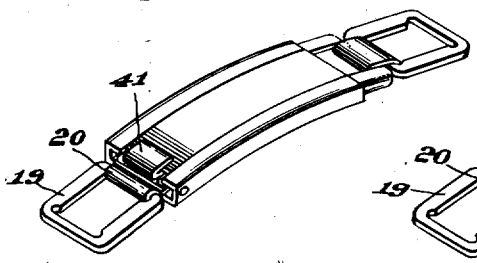
Fig. 2
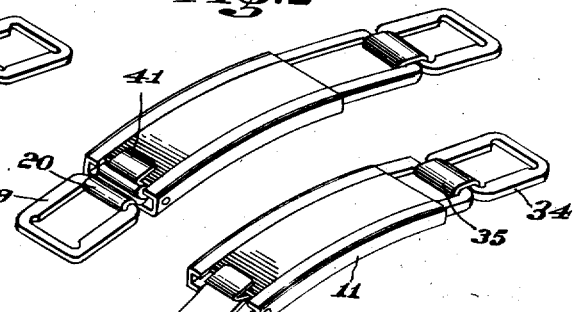
Fig. 3
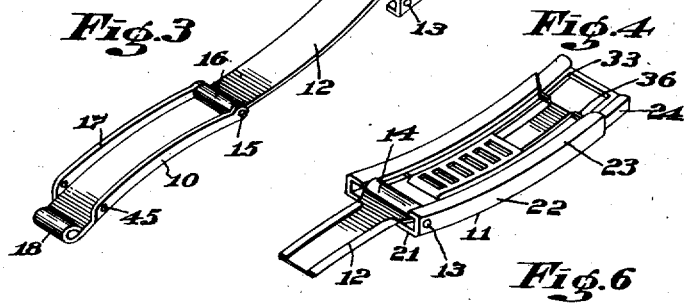
Fig. 4
Fig. 5
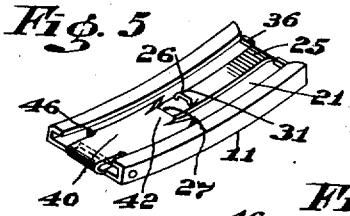
Fig. 6
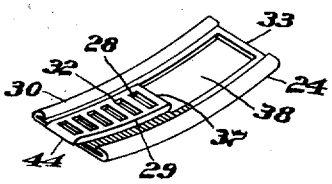
Fig. 8
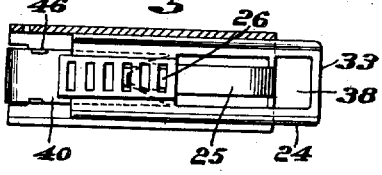
Fig. 7
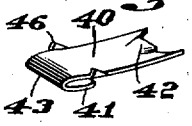
Fig. 9
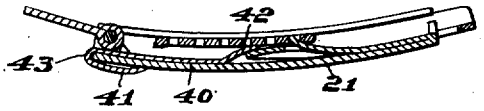
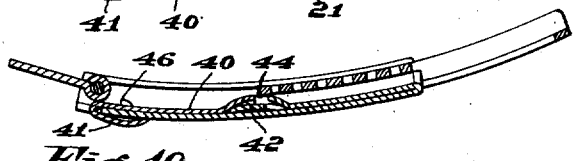
Fig. 10
INVENTOR
Axel George Eklund
BY Rowland V. Patrick
ATTORNEY Reissued Mar. 29, 1938

Re. 20,677

UNITED STATES PATENT OFFICE 20,677

BRACELET BUCKLE CONSTRUCTION

Axel George Eklund, North Attlebero, Mass., assignor to J. F. Sturdy's Sons Co., a corporation of Massachusetts Original No. 2,082,621, dated June 1, 1937, Serial No. 677,075, June 22, 1933. Application for reissue November 8, 1937, Serial No. 173,489

18 Claims. (Cl. 24—71)

This invention relates to a bracelet buckle having a plurality of sections which are relatively movable for varying the encircling size of a bracelet in which it is connected and has for one of its objects the provision of a foldable buckle having a sliding ratchet arrangement therein in which the ratchet may be released and the buckle opened by one continued movement of the operator's hand.

Another object of the invention is the provision of a ratchet buckle in which the pawl and ratchet connection can be released by a finger-piece which also serves for opening the buckle or disposing the sections thereof in unfolded position.

Another object of the invention is the provision of a foldable buckle having a ratchet slide therein with an arrangement such that the ratchet is entirely released prior to the unfolding of the buckle and by the same manual movement which serves to unfold the buckle.

Another object of the invention is the provision of a foldable ratchet buckle having a slidable part in which the ratchet mechanism may be released and automatically restored to operating position by a movement of the sliding part towards contracted position.

Another object of the invention is an arrangement by which this automatic return of the pawl to locking position by movement of the slide will occur regardless of whether the buckle is in folded or unfolded position.

Another object of the invention is the provision of a foldable buckle having a ratchet slide which may be moved in one direction over a resilient pawl and which is held by the pawl against movement in the opposite direction and with means to flex and retain the pawl in released position after being moved to such position by the operator.

Another object of the invention is to cam and hold the resilient pawl of a ratchet buckle out of working position.

With these and other objects in view, the invention consists of certain novel features of construction, as will be more fully described, and particularly pointed out in the appended claims.

In the accompanying drawing:

Fig. 1 is a perspective view of the buckle in closed position and with the slide as moved inwardly in the section in which it is mounted.

Fig. 2 is a perspective view of the buckle in similar position to that shown in Fig. 1 but with the slide member as drawn outwardly from the buckle and with the fingerpiece in the position in which it causes a release of the ratchet mechanism.

Fig. 3 is a perspective view of the buckle with two of the sections unfolded therefrom.

Fig. 4 is a perspective view of one end section of the buckle looking at the under side thereof and showing the rack or ratchet in the slide.

Fig. 5 is a perspective view of the end section of the buckle and with the auxiliary release slide member as mounted therein.

Fig. 6 is a perspective view of the main slide which may be moved into and out of the end section of the buckle.

Fig. 7 is a perspective view of the release slide.

Fig. 8 is a bottom view in section, of the parts illustrated in Fig. 4.

Fig. 9 is a sectional view thru the end section showing the parts in locked position.

Fig. 10 is a view similar to Fig. 9 showing the ratchet means in disengaged or in unlocked position.

In the use of a foldable ratchet buckle which serves as a center connection between the parts of a bracelet, it is frequently desirable to provide an arrangement by which, if the slide be moved into the end section too far, it may be released to be withdrawn without unfolding the sections one from the other. It is also desirable that such release of the ratchet mechanism occur when the buckle is in unfolded position and in order that this may be accomplished in a buckle which will have an attractive appearance, be comfortable to wear and be mechanically practical, I have provided a plurality of foldable sections and a slide in one section with the ratchet formed in the slide and a pawl provided on the section and have provided a withdrawal member by which the pawl and ratchet mechanism may be disengaged while the sections are in folded position and which means also is engaged for unfolding the sections one from the other in opening the buckle for enlarging the encircling size of a bracelet in detaching the same from the wrist, whereby when the buckle is picked open by the thumb nail engaging the part designed for such purpose, the ratchet will be first released and will remain in such released position until the slide is again forced inwardly which would normally serve to operate the ratchet by which movement the fingerpiece is moved out of released position, the movement of the fingerpiece, however, being small so that the position of the fingerpiece is not readily noticed or thrown out of harmony of appearance, with regard to the position it assumes on the device; and the following is a more detailed description of the present embodiment of this invention illustrating the preferred means by which these advantageous results may be accomplished:—

With reference to the drawing, I have provided an end section 10 and another end section 11 which are both hinged to an intermediate section 12 in any suitable manner, such as by means of a pivot pin 13 extending thru a loop eye 14 in the section 12 and a pivot pin 15 extending thru the loop eye 16 at the opposite end of the section 12.

The section 10 is generally channel shape being provided with side walls 17 which serve to stiffen the same and with an end eye 18 which will serve to connect this end section to the end link 19 of a bracelet chain by a suitable connector 20.

The end section 11 is provided with a top wall 21 and side walls 22 having inturned flanges 23 which serve to guide the slide member 24 in its sliding movement into and out of the section 11. On the section 11 there is folded up from the top wall a tongue 25 which is provided with a latch or pawl 26 and a downwardly-extending end 27 for manipulation of the pawl. The resilience of the stock of the tongue 25 is such as to tend to move the free end of this tongue away from the inside surface of the top wall 21 and into a position to engage a ratchet formed in the slide 24. This ratchet is formed by a series of cutouts or recesses 28 in the web portion 29 of the stock of the slide 24 which extends between the oppositely rolled edges 30 thereof, and which fit and are guided by the inturned flanges 23 of the top end section 11 above described.

The latch or pawl 26 is so shaped that it will permit the slide 24 with the ratchet 28 therein to be moved inwardly by reason of its moving over the inclined surface 31 of the latch 26 but it will be locked against outward movement by reason of the edge of this latch or pawl extending into one of the openings 28 and engaging one of the abutting edges 32 thereof. Thus differently desired positions of adjustments may be had of the encircling size of a bracelet which is attached to the cross bar 33 of this slide such as by the end link 34 and connector 35, as illustrated in Figs. 1, 2 and 3.

The slide 24 is limited in its outward movement by fingers 36 bent from one end of the section 11 at either side of the tongue 25 by engagement with the end 37 of the web to prevent detachment of the slide from its section. These fingers or stops being positioned or thrown up into the position illustrated in the opening 38 in the slide, after the slide is assembled. These fingers 36 will also serve to limit the inward movement of the slide by engagement with the cross bar 33 as will also the rolled end or eye 14 of the middle section 12 against which the end of the slide will abut to limit this movement.

The sections are held in folded position by reason of any suitable friction means which preferably may be detents or protuberances 45 extending outwardly from the free end of one end section 10 and engaging the edge flanges 23 to be positioned inwardly thereof by the resilience of the stock and spreading of the flanges laterally.

In order that the pawl and ratchet mechanism may operate in an effective way, I have provided a release member 40 which is slidably mounted in the section 11 and which extends between the slide 24 and the top wall 21 longitudinally of and from the end of this section. The extremity of this member 40 is turned over the top section to provide a fingerpiece exposed at the end of the section.

This release member 40 is also provided at its inner edge with an upwardly bent portion 42 which provides an inclined cam surface of such length as to extend over at all times the end 27 of the tongue 25, the relation being such that when this release member is forced inwardly it will cause the tongue to be moved towards the top wall 21 and withdraw the latch or pawl 26 from engagement with the ratchet and thus release the slide member so that it may be moved relatively to the top end section 11. Projections 46 serve to engage the flange 23 and guide the release member 40 in its movement.

The fingerpiece 41 is located at the end of the top section which is to be lifted for unfolding of the sections 10, 11 and 12 when in closed position on the arm and is so positioned that it will be engaged for this purpose, whereby when the finger nail is positioned beneath the end 43 of this release slide for the purpose of lifting an end of the top section from its frictionally held folded position the first operation which will occur will be the movement of this release slide inwardly to withdraw the pawl 26 from the rack thus freeing the slide for movement, and after this the sections may then be unfolded to open position. The slide, however, retains its innermost position of holding the pawl out of engagement with the rack until the slide is attempted to be forced inwardly again by some manual pressure, which will not often occur until after the bracelet is again in closed or folded position on the arm and it is desired that the proper adjustment be had, whereupon the first or initial movement of the slide inwardly will cause the outward movement of the release slide 40 either by reason of the friction of the slide 24 moving thereon or by positive engagement of the end portion 44 of the main slide 24 engaging this raised portion 42 of the release or auxiliary slide, after which the tongue will spring back to move the pawl into operative position so that it may snap from one opening 28 to another until the slide is positioned the desired amount inwardly to secure the proper adjustment of the parts.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a bracelet buckle, a plurality of sections hinged together to fold one over the other, a slide member in one section, pawl and ratchet means provided on said section and member to permit movement of the slide member in one direction and hold it against movement in the opposite direction, means movably secured to said section to disconnect said pawl and ratchet means prior to unfolding said sections, said means holding said pawl and ratchet means disconnected, and a fingerpiece for operating said disconnecting means and also serving for unfolding said sections.

2. In a bracelet buckle, a plurality of sections hinged together to fold one over the other, frictional means for retaining said sections in folded position, one of said sections having a portion extending inwardly from one end thereof and spaced from the walls thereof to provide a resilient pawl, a member slidably mounted in said section and provided with a rack to be engaged by said pawl, and a release member slidably secured to the end portion of said section to remove the pawl from engagement with said rack.

3. In a bracelet buckle, a plurality of sections hinged together to fold one over the other, frictional means for retaining said sections in folded position, one of said sections having a tongue extending inwardly from one end thereof with a part of its stock intermediate the length of said tongue raised to provide a pawl with an inclined surface and an abutting surface, a member slidably mounted in said section and provided with a rack to be engaged by said pawl, and a release member movably secured to said section to engage the free end of said tongue to flex the tongue and remove the pawl from engagement with the rack.

4. In a device of the type specified, the combination of a member adapted for connection to one end of a bracelet, a second member slidable on the first member and adapted to be connected to the opposite end of the bracelet, ratchet means on one of said members, latch means on the other member engageable with the ratchet means for retaining the members in adjusted relationship, and means slidable longitudinally of said members to release the latch means from the ratchet means, said slidable means being engageable by said ratchet means to be moved thereby to inoperative position.

5. In a device of the type specified, the combination of a member adapted for connection to one end of a bracelet, a second member slidable on the first member and adapted to be connected to the opposite end of the bracelet, ratchet means on one of said members, latch means on the other member engageable with the ratchet means for retaining the members in adjusted relationship, means slidable longitudinally of said members to release the latch means from the ratchet means, and an abutment on said slidable means engageable by said ratchet means to move said slidable means to inoperative position.

6. In a device of the type specified, the combination of a member adapted for connection to one end of a bracelet, a second member slidable on the first member and adapted to be connected to the opposite end of the bracelet, ratchet means on one of said members, latch means on the other member engageable with the ratchet means for retaining the members in adjusted relationship, means slidable longitudinally of said members to release the latch means from the ratchet means, and an abutment on said slidable means frictionally engageable by said ratchet means to move said slidable means to inoperative position.

7. In a device of the type specified, the combination of a member adapted for connection to one end of a bracelet, a second member slidable on the first member and adapted to be connected to the opposite end of the bracelet, ratchet means on one of said members, a pawl on the other member engageable with the ratchet means to hold said members in different positions of adjustment, and manually operable means slidable longitudinally of said members to cam against the pawl to release it from the ratchet means, said slidable means being engageable by said ratchet means to be moved thereby to inoperative position.

8. In a device of the type specified, the combination of a member adapted for connection to one end of a bracelet, a second member slidable on the first member and adapted to be connected to the opposite end of the bracelet, ratchet means on one of said members, a pawl on the other member engageable with the ratchet means to hold said members in different positions of adjustment, and manually operable means slidable longitudinally of said members to cam against the pawl to release it from the ratchet means, said slidable means being frictionally engageable by said ratchet means to be moved thereby to inoperative position.

9. In a bracelet buckle, a section, a member slidably mounted in said section to extend beyond one end of said section, means in said section for engaging and securing said member in adjusted positions, and means secured at the opposite end of said section and movable longitudinally thereof for disengaging said first means from engagement with said slidable member.

10. In a bracelet buckle, a section, a member slidably mounted in said section to extend beyond one end of said section, means in said section for engaging and securing said member in adjusted positions, and means secured at the opposite end of said section and movable longitudinally thereof for disengaging said first means from engagement with said slidable member, said movable means being engageable by said slidable member to be moved thereby to inoperative position.

11. In an extension device, a top plate, an adjusting link slidably connected thereto, and an extension plate hingedly connected to said top plate and releasably foldable in contracted relation thereto, said link and top plate having cooperating normally engaged pawl and detent elements, the top plate element having a part extending longitudinally therefrom and past the hinge connection, and movable to disengage said elements.

12. In an extension device, a top plate, an adjusting link slidably connected thereto, and an extension plate hingedly connected to said top plate and releasably foldable in contracted relation thereto, said link and top plate having cooperating normally engaged pawl and ratchet elements, the top plate element having a part extending longitudinally therefrom and past the hinge connection, and movable to disengage said elements.

13. In a bracelet buckle, a plurality of sections hinged together to fold one over the other, a member slidably mounted in one of the end sections of said plurality of sections, one of the ends of said end section being liftable from the other section for unfolding the sections, means for engaging and securing said member in adjusted position, and a fingerpiece movably secured at said liftable end for lifting the same to unfold said sections, said fingerpiece being slidable longitudinally of said one end section and connected to said engaging and securing means for operating the same.

14. In a bracelet buckle, a section, a member slidably mounted in said section, means for engaging and securing said member in adjusted position in said section, manual operable means for rendering said engaging and securing means inoperative when said manual operable means is moved to one position, said manual operable means being engageable by said slidably mounted member to be moved thereby for restoring said engaging and securing means to operative position upon movement of said slidably mounted in one direction.

15. In a bracelet buckle, a plurality of sections hinged together to fold one over the other, frictional means for retaining said sections in folded position, a resilient pawl provided on one of said sections, a member slidably mounted in said section to extend beyond one end thereof and provided with a rack to be engaged by said pawl, and a release member slidably mounted on the other end of said section and having cam means cooperating with said pawl to cam the pawl from engaging with said rack.

16. In a bracelet buckle, a plurality of sections hinged together to fold one over the other, a slide member in one of said hinged sections, pawl and ratchet means provided on said section and member to permit movement of the slide member in one direction and hold it against movement in the opposite direction, and means movably secured to said hinged section and having cooperative relation with said pawl and ratchet means to disconnect said pawl and ratchet means prior to unfolding said sections, said movable means including a finger piece extending from one end of said section.

17. In a buckle having a plurality of extensible sections adapted for connection between bracelet ends, a plate section, a slide member slidably associated with said plate section and held against separation therefrom, pawl and ratchet means provided on said plate section and slide member to permit movement of the slide member in one direction and hold it against movement in the opposite direction, and means movably secured to said plate section and having cooperative relation with said pawl and ratchet means to disconnect said pawl and ratchet means, said movable means extending longitudinally of and from one end of said plate section to provide a finger piece disposed exteriorly of said section.

18. In a bracelet buckle, a housing section, a slide member slidably retained in said housing, pawl and ratchet means provided on said housing and member to permit movement of the slide member in one direction and hold it against movement in the opposite direction, and means movably secured to said housing and having cooperative relation with said pawl and ratchet means to disconnect said pawl and ratchet means, said movable means extending longitudinally within said housing intermediate the edges thereof and protruding from one end of said housing to provide a finger piece disposed exteriorly of said housing, said finger piece being located intermediate said housing edges or the projections thereof.

AXEL GEORGE EKLUND.